June 30, 1953 — W. KNAUF — 2,643,826
FILM FEEDING AND POSITION INDICATING
MECHANISM FOR PHOTOGRAPHIC CAMERAS
Filed Feb. 7, 1951

INVENTOR,
Wilhelm Knauf
BY Charles Shepard
Attorney

Patented June 30, 1953

2,643,826

UNITED STATES PATENT OFFICE 2,643,826

FILM FEEDING AND POSITION INDICATING MECHANISM FOR PHOTOGRAPHIC CAMERAS

Wilhelm Knauf, Braunschweig, Germany, assignor to Franke & Heidecke, Fabrik Photographischer Prazisions - Apparate, Braunschweig, Germany, a firm of Germany Application February 7, 1951, Serial No. 209,765
In Germany February 23, 1949

13 Claims. (Cl. 242—71)

1

This invention relates to film feeding and exposure counting or film position indicating mechanism for photographic cameras.

An object of the invention is the provision of generally improved and more satisfactory film feeding and position indicating mechanism, for showing the user of the camera the position of the film, that is, the number of the picture frame or exposure area of the film which is in picture-taking position in the camera.

Another object of the invention is the provision of such mechanism so designed and constructed that with a relatively simple and inexpensive structure, the film position indicator will be automatically restored to its initial or starting position when the camera is opened to remove the exposed film and insert a fresh unexposed film.

Still another object is the provision of such mechanism so designed and constructed as to have sufficient lost motion to allow for reasonable manufacturing inaccuracies and for ordinary wear and tear upon long continued use of the camera, without endangering the successful operation of the mechanism.

A further object is the provision of film feeding and position indicating mechanism so designed and constructed as to be of simple and inexpensive form and at the same time to be capable of efficient use in cameras having no film sight window adjacent the back of the film, thus enabling the cameras to be used safely with film having only a paper leader strip and paper trailer strip without any paper backing or covering on the film itself.

A still further object is the provision of mechanism having, in combination with the film position indicating structure of the general character above indicated, a simple and efficient structure for locking the camera back so that it cannot be accidentally opened until all of the exposures on the film have been completed.

These and other desirable objects may be attained in the manner disclosed as an illustrative embodiment of the invention in the following description and in the accompanying drawings forming a part hereof, in which.

2

Figure 1:
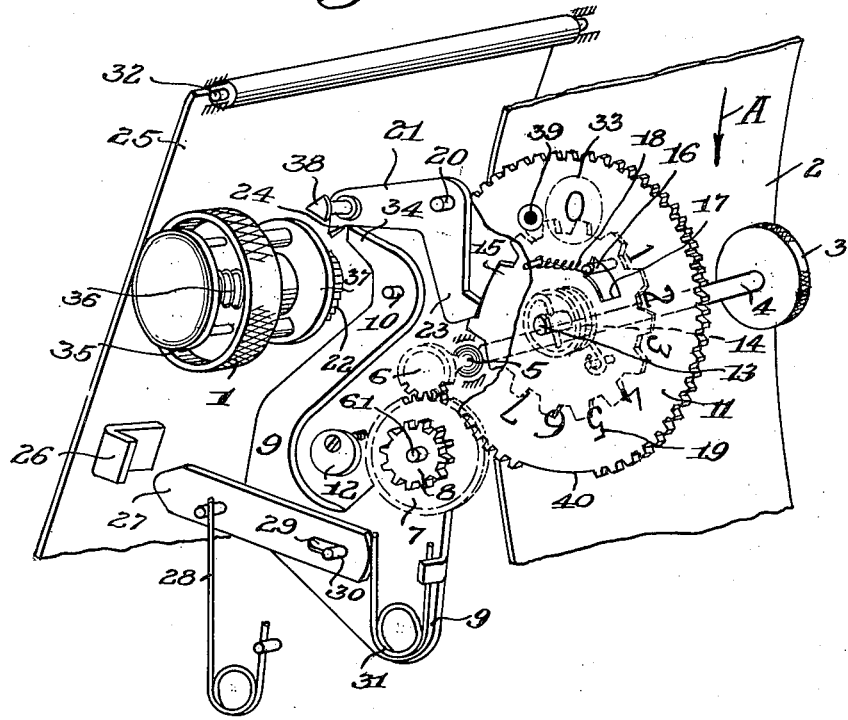
Fig. 1 is a somewhat diagrammatic or schematic perspective view of film feeding and film position indicating mechanism in accordance with a preferred embodiment of the invention, but without the camera back locking mechanism, which is here omitted for the sake of clarity.
Figure 3:
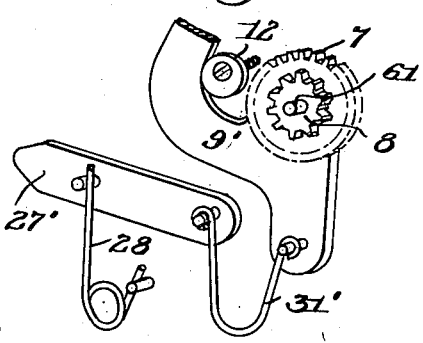

Fig. 3 is a fragmentary view similar to a portion of Fig. 1 showing a modification of one of the details of structure shown in Fig. 1.

The same reference numerals throughout the several views indicate the same parts.

Except for the film position indicating parts and associated parts of the present invention, the camera itself may be of any known or conventional construction, and is not here illustrated.

Referring now to Fig. 1, the film winding knob is indicated at 1 and is connected through any suitable operative connection to the film take-up spool so that when the knob 1 is turned, it will advance the film 2 in the direction of the arrow A. The advancing movement of the film turns the measuring roller 3 which is fixed to the shaft 4 and which is held in frictional driving contact with the film by the pressure of a spring (not shown). Near the opposite end of the shaft 4 from the measuring roller 3, the shaft is supported by a spherical journal or bearing 5 in order to allow for the necessary slight movement of the roller 3 toward and away from the film. Beyond the bearing 5, the shaft 4 has fixed to it a toothed gear 6, engaging a larger toothed gear 7 rigidly connected to a pinion 8, the gear and pinion both being mounted to turn on a stub shaft or stud 61 secured to the lever 9 having the shape illustrated in the drawings, which lever 9 is mounted to oscillate through a slight range on a pivot pin or stud 10 having a suitable bearing in a fixed part of the camera body.

When the lever 9 is swung in a counterclockwise direction on its pivot 10, the pinion 8 is carried into engagement with a gear 11 mounted on a shaft 13 substantially parallel to but spaced laterally from the shaft 4. The extent of movement of the pinion 8 toward the gear 11 is controlled by an eccentric stop 12 lying in the path of the lever 9, which may be easily adjusted by slightly turning the eccentric. Although the oscillatory axis 10 of the lever 9 is not concentric with the gear 6, yet the teeth of the gears 6 and 7 are sufficiently deep so that these two gears remain in meshing contact with each other at all times, notwithstanding the slight swinging of the gear 7 about the oscillatory axis 10 as a center, when the pinion 8 is brought into or out of mesh with the gear 11.

A helical spring 14 is operatively connected to the gear 11, and constantly tends to restore this gear in a clockwise direction to an initial or starting position, wherein a suitable designation such as the numeral 0, carried by the gear or by a numeral plate fixed to the gear, will appear through the sight window of the camera indicated diagrammatically at 33. This gear (or the numeral disk fixed to it) also carries a series of other numbers 1, 2, 3, 4, etc., as indicated at 19, which successively appear through the sight window 33 as the gear is turned in a counterclockwise direction from its initial starting position, to indicate which of the picture frames or exposure areas is in exposure position in the focal plane of the camera.

On the same shaft 13 is a stop disk or locking disk 15 (which may also be referred to as a cam disk) located close to the gear 11, the disk 15 carrying a pin 16 projecting laterally through an arcuate slot 17 in the gear 11. The disk 15 is rotatable relative to the gear 11, but only to the limited extent allowed by the length of the slot 17, the ends of which act as limit stops for the pin 16. A coil spring 18 connected at one end to the pin 16, and at the other end to a pin fixed on the gear 11, serves constantly to turn the disk 15 in a counterclockwise direction relative to the gear 11 so as to hold the pin 16 at the counterclockwise end of the slot 17, except when the parts are displaced from this position by force sufficient to overcome the tension of the light spring 18.

On the pivot shaft or stud 20 journalled in a fixed part of the camera case is a two-armed lever or bellcrank lever 21 having at one end a nose 23 lying in the plane of the disk 15 and adapted to enter one or another of various notches in the periphery of this disk 15. The other end 24 of this lever 21 is formed as a locking pawl lying in the plane of a locking ratchet 22 secured to the film feeding knob 1 or to the shaft of such knob. The parts are so proportioned that when the nose 23 of the bellcrank lever lies on a smooth part of the periphery of the disk 15, the pawl end 24 is out of engagement with the ratchet 22. But when the disk 15 is turned so that one of the notches comes opposite the nose 23, then a spring (not shown) turns the bellcrank lever 21 in a counterclockwise direction on its pivot 20, so that the nose 23 enters the associated notch of the disk 15 and this allows the pawl end 24 to drop into engagement with the locking ratchet 22, preventing further turning of the film feeding or winding knob 1.

The cam disk 15 is provided, as seen in Fig. 1, with a smooth periphery portion for some distance from the position at which the nose 23 contacts with the disk 15 when in the initial or starting position. Following this smooth periphery portion, there are a series of notches into which the nose 23 may drop as the disk turns to bring these successive notches opposite the nose 23. The spacing of the notches is so arranged, relative to the diameter of the film measuring roller 3 and the gear ratio of the various gears 6, 7, 8, and 11, that as successive exposure areas of the film are brought into exposure position, successive notches of the disk 15 will be brought opposite the end 23 of the lever 21, and likewise successive indicating numerals 19 will be brought to the observation window 33.

When loading the camera with film, the fresh film is wound forwardly while the camera back 25 is in its open position (being swung open on its hinge 32) until a predetermined reference mark on the paper leader strip of the film comes opposite a predetermined reference point on the camera. This winding is possible because at this time the parts are in the position shown in Fig. 1, the pawl 24 is out of contact with the ratchet 22 and does not interfere with the winding knob 1, and the gear 8 is out of mesh with the gear 11 so that the measuring roller 3 and pinion 8 may turn freely without causing any turning of the gear 11, which is maintained in its initial or starting position by the spring 14, and the indication "0" stays opposite the observation window 33. Then the camera back 25 is tightly closed. During the closing movement, a member 26 on the camera back comes against the end of a slide member 27 and moves this member in a rightward direction when viewed as in Fig. 1, against the action of a spring 28 which constantly tends to move the slide member 27 leftwardly. The slide 27 is operatively connected to the lower part of the lever 9 so that the rightward movement of this member 27 carries the lower end of the lever 9 rightwardly with it, to bring the pinion 8 into engagement with the gear 11. But there is a lost motion connection between the member 27 and the lever 9, so that the range of movement of the member 27 may be made greater than the movement of the lever 9, thereby insuring that the lever 9 will move far enough to engage the pinion 8 with the gear 11, notwithstanding any reasonable manufacturing inaccuracies, and notwithstanding any looseness that may ultimately develop in the hinge 32 of the camera back 25, or in slight springing or bending of the camera back or other defects as a result of wear and tear after long continued use of the camera.

This lost motion connection may take various forms. For example, the member 27 may have a slot 29 formed longitudinally therein, and a pin 30 fixed to the lever 9 may extend laterally into this slot 29. A spring 31, pressing rightwardly against an ear on the lever 9 and pressing leftwardly against the end of the member 27, constantly tends to maintain the pin 30 against the right hand end of the slot 29. As the slide member 27 is moved rightwardly by engagement with the cover 25 during its closing movement, the spring 31 will tend to cause equal movement of pin 30 on the lever 9, but the member 27 may continue to move rightwardly some additional distance after the motion of the lever 9 is stopped by engagement with the adjustable eccentric member 12 which serves as an abutment.

Figure 2:
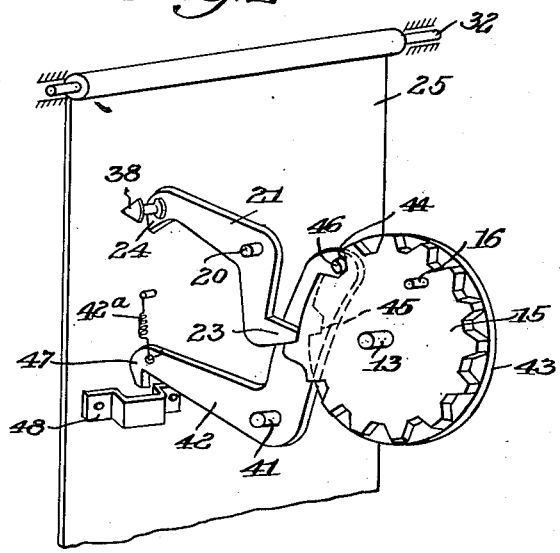
Fig. 2 is a perspective view of the camera back locking mechanism preferably used along with the other mechanism shown in Fig. 1.

An alternative construction of the lost motion connection between the member 27 and the lever 9 is indicated diagrammatically in Fig. 2. Here, instead of the pin and slot connection 29, 30, the slide member 27' is connected to the lever 9' simply by the U-shaped spring 31' having its ends fastened to suitable studs on the two members 27' and 9'. The spring normally has the shape shown in Fig. 2, but is capable of flexing from that shape under the influence of a displacing force. Thus the spring constitutes a lost motion connection tending to move the lever 9' to the same extent as the movement of the member 27'. But the lever 9' does not necessarily have to move as far as the member 27', for when the lever 9' comes into contact with the adjustable stop member 12 and can move no farther, the member 27' may still continue to move a slight additional distance by flexing the spring 31'.

In both forms of lost motion connection, the slide member 27 or 27' is moved far enough by the closing of the camera back, to insure that the spring 31 or 31' will be flexed upon completion of the closing movement, thus adequately holding the pinion 8 in meshing relation to the gear 11 even if the camera is subjected to jolts and jars tending to unmesh these gears.

Thus upon closing the camera back (after the index mark on the film leader strip is brought opposite the index mark on the camera body) the gears 8 and 11 are automatically meshed with each other and the film control mechanism becomes operative. Winding of the film is now continued by further turning of the winding knob 1, and the movement of the film, through the measuring roller 3 and the gear train 6, 7, 8, causes turning of the gear 11 and the winding (in a further tensioning direction) of the spring 14. The frictional drag or resistance of the nose 23 on the periphery of the disk 15 at first causes this disk to remain stationary when the gear 11 begins to turn, as the force of the spring 18 is not sufficient to overcome the frictional drag imposed by the nose 23. But a slight turning of the gear 11 brings the clockwise end of the slot 17 into engagement with the pin 16, thus forcing the disk 15 to turn notwithstanding the frictional drag caused by the nose 23, until the first notch of the disk 15 comes opposite the nose 23. When this position is reached, the first film position numeral 1 associated with the gear 11 has by this time come opposite the sight window 33. At this time the nose 23 of the lever 21 drops into the first notch of the disk 15, stopping the rotation of the disk, and simultaneously the pawl 24 drops into engagement with the ratchet 22 and stops further turning of the winding knob 1.

The numeral 34 designates an extension on the lever 9, which extension, under certain conditions, engages the lever 21 to hold the pawl 24 out of engagement with the ratchet 22 and to hold the nose 23 away from the disk 15, as further described below.

The film is now in position for taking the first exposure. After the exposure is made, the parts are unlocked for another film feeding operation by means of any convenient unlocking mechanism which will momentarily release the nose 23 from the notch of the disk 15. For example, the release may be effected by pressing inwardly on the cap member or plunger 35 at the outer side of the winding knob 1, which member is normally pressed outwardly by a light spring 36. The member 35 is connected to an annular flange 37 and thus presses it axially inwardly, so that the periphery of the flange comes into contact with a conical portion 38 on the bellcrank lever 31, exerting a cam action against the conical part 38 to press it upwardly and thus to release the nose 24 from the ratchet 22 and at the same time to release the nose 23 from the notch in the disk 15. The momentary release of the nose 23 from the disk 15 will allow the disk to be pulled slightly in a counterclockwise direction by the spring 18, so that the notch is no longer in alinement with the nose 23, and the nose will not drop back into the notch when the plunger 35 is released. The winding knob 1 can now be turned for one more film feeding operation, during which, as before, the friction of the nose 23 on the periphery of the disk 15 will cause the disk to lag a little behind the motion of the gear 11. As winding is continued, the nose 23 of the lever 21 drops into the next succeeding notch of the disk 15, thus bringing the next succeeding film frame or picture area of the film into proper exposing position in the camera, and at the same time bringing the next one of the indicating numerals 19 into alinement with the observation window 33.

When the last picture area is in the exposure position and the last indicating numeral is opposite the observation window 33, the nose 23 has dropped into the last notch of the disk 15. Beyond this, there are no further notches, so that upon the next winding operation the film may be completely wound onto the take-up spool, or at least wound until a special mark such as shown at 39 (associated with the series of indicating numerals 19) comes around to a position visible through the window 33. By the time this special mark 39 reaches the observation window, the film has been wound far enough onto the take-up spool so that the trailer strip of paper on the film fully covers the film on the take-up spool, making it safe at this time to open the camera back 25. At this time, a blank portion 40 of the periphery of the gear 11 comes around to the pinion 8 so that during the final part of the winding of the film and the trailer strip, the pinion 8 may continue to turn without causing any further movement of the gear 11.

The camera back 25 is now swung to its open position for unloading the exposed film and loading a fresh roll of film in the camera. As the back is opened, it releases the rightward pressure on the member 27, allowing the spring 28 to move this member 27 leftwardly, which thus moves the lower end of the lever 9 leftwardly and withdraws the pinion 8 from engagement with the gear 11 (or rather, from the blank space 40 at the periphery of this gear). This disengagement of the pinion 8 from the gear 11 allows the spring 14 to restore the gear 11, and with it the disk 15, backwardly or in a clockwise direction to the initial starting position of the parts. When the lever 9 moves to disengage the pinion 8 from the gear 11, an extension 34 on the lever 9 moves up against the under side of the bellcrank lever 21 to hold the pawl 24 out of engagement with the ratchet 22 and to hold the nose 23 away from the disk 15 so it will not drop into any of the notches of this disk while the disk is being turned by the spring 14 back to its initial position. The fresh film may now be loaded into the camera and, as before, the feeding knob 1 is turned until the special starting mark or indication on the film comes opposite the appropriate reference mark on the camera body, whereupon the camera back 25 is tightly closed and the film measuring and indicating mechanism will then operate just as above described. The special reference mark on the camera body, for cooperation with the starting mark on the film, is preferably formed by an appropriate portion of the lever 9 or the slide member 27 (or 27'), since both of these members have portions lying close to the edge of the expanse of film (or film leader strip) and are readily visible when the camera back is open. For example, this reference mark may be formed by the rear end of the slide 27 or 27', which may be somewhat tapered or pointed for this purpose, as seen in the drawings.

With the arrangement thus far described, it is seen that if the camera back were accidentally opened before the film has been used up, this opening would automatically disengage the pinion 8 from the gear 11 and would cause an automatic resetting of the gear 11 and disk 15 to the initial starting position. Not only would some of the film be spoiled, by premature opening of the camera back, but the automatic resetting of the gear 11 and disk 15 to starting position would cause an incorrect film position numeral to appear through the window 33 when the back is again closed and film winding is renewed. In order to avoid these results, it is desirable to provide an interlock between the camera back and the film position indicating mechanism, which interlock may conveniently be constructed in the manner diagrammatically illustrated in Fig. 3.

On a suitable shaft or pivot stud 41 mounted in a fixed location in the camera body, there is a bellcrank lever 42, normally urged by a spring 42a in a clockwise direction about the pivot 41. One end of this lever 42 lies close to a disk 43 which is concentric with and fixed to the measuring disk 15 to turn therewith. The disk 43 has a smooth circular periphery except at two points where it is notched at 44 and 45. A pin 46 extending laterally from the bellcrank 42 rides on the smooth periphery of the disk 43, or drops into the notches 44 or 45 when the disk is turned to bring either one of these notches opposite the pin 46. The sides of the notches are sloped to a sufficient extent so that turning of the disk will force the pin 46 up out of the disk and onto the smooth periphery.

The notch 44 is so placed that it will be opposite the pin 46 when the parts 11, 15, and 43 are in the initial or starting position. The other notch 45 will be opposite the pin 46 when the parts 11, 15, and 43 are in the final position with the film and at least part of the trailer strip safely wound on the take-up spool and with the special finishing mark 39 opposite the observation window 33. In all intermediate positions between these two positions, the pin 46 must ride on the smooth periphery of the disk 43. When the pin 46 is on this smooth periphery, a hook-like end 47 on the other arm of the bellcrank lever 42 engages in a stirrup-like or U-shaped locking member 48 fixed to the inside of the camera back 25. This prevents the camera back from being opened. But when the film has been completely exposed and wound into the position where the special mark 39 is opposite the observation window 33 and where the blank part 40 of the gear 11 is opposite the pinion 8, then the second notch 45 of the disk 43 has been brought opposite the pin 46, so that the spring 42a of the lever 42 turns this lever slightly in a clockwise direction to remove the locking nose 47 from the locking member 48, and the camera back 25 may now be opened. The opening thereof, as above described, allows the spring 14 to restore the gear 11 and disk 15 to their initial position, thereby also restoring the disk 43 to its initial position, and when the disk is thus restored to initial or starting position, the first notch 44 thereof is brought opposite the pin 46 so that the lever 42 assumes a position in which the camera back may now be closed. Then as soon as the further winding of the film commences, the notch 44 will be moved away from the pin 46 and the camera back 25 will be locked against opening until the winding of the film has been completed, as above described.

By making such slight changes in arrangement of notches as will be understood by those skilled in the art, the present invention may also be applied to cameras of the type in which the film, after completion of all exposures, is wound back onto the initial supply roll, rather than being wound completely forwardly to a take-up roll. Although an observation window 33 is provided for observing the sequential numerals 19 for indicating the position of the film, it is seen that this window 33 need not be near the film itself, and can be completely light-shielded from the film. Consequently, with the present arrangement there is no necessity for any observation window in the camera back near the film, and the camera may be used equally well with paper backed film or with film having no paper backing but only a paper leader strip and trailer strip, or indeed with film not even having a leader strip and trailer strip, if it is permissable to waste a little of the length of the film strip at one or both ends, when loading or unloading, as for example when a film cassette is used.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including a camera back movable between open and closed positions, film winding means, a rotary film position indicator, spring means tending to turn said position indicator individually in one direction to an initial starting position, a driving member turned by advancing movement of the film, an engageable and disengageable but normally disengaged operative connection between said driving member and said position indicator held engaged by the back when the latter is in closed position to turn said position indicator in a spring tensioning and opposite direction when said driving member is turned by an advancing movement of the film, and means for disengaging said operative connection when said camera back is moved to an open position, so that said spring means may restore said position indicator to its initial starting position.

2. A photographic camera including a camera back movable between open and closed positions, film winding means, a rotary film position indicator, a rotary film locking control member associated with said position indicator to turn therewith, means controlled by said control member for locking said film winding means temporarily against further operation when said control member rotates to any one of a series of predetermined locking positions, spring means tending to turn said position indicator and said control member in one direction to an initial starting position, a driving member turned by advancing movement of the film, an engageable and disengageable normally disengaged operative connection between said driving member and said position indicator held engaged by the back when the latter is in closed position to turn said position indicator in a spring tensioning direction when said driving member is turned by an advancing movement of the film, and means for disengaging said operative connection when said camera back is moved to an open position, so that said spring means may restore said position indicator and said control member to initial starting position.

3. A structure as defined in claim 2, further including means controlled by the position of said camera back for rendering said locking means ineffective when said camera back is moved to an open position.

4. A structure as defined in claim 1, in which said engageable and disengageable connection includes two swinging gears mounted for relative movement toward each other into meshing relation to each other and for relative movement away from each other to an unmeshed relationship while remaining operatively connected with the driving member turned by movement of the film.

5. A structure as defined in claim 4, in which said means for disengaging said operative connection includes a spring which is tensioned by closing movement of said camera back, said spring when tensioned serving to hold said two gears in meshing relation to each other.

6. A photographic camera including a camera back movable between open and closed positions, film winding means, a rotary member mounted for rotation, spring means tending to turn said rotary member in one direction, film driven means for turning said rotary member in an opposite direction, means operated by said camera back for rendering said film driven means effective when said camera back is closed and for rendering said film driven means ineffective when said camera back is opened, so that said spring means may turn said rotary member back to its initial position, and means controlled by said rotary member for locking said camera back against opening movement when said rotary member is in a predetemined range of rotary positions.

7. A structure as defined in claim 6, in which said means operated by said camera back includes a first part movable between two positions respectively rendering said film driven means effective and ineffective, a second part cooperating with said camera back in position to be moved in one direction by closing movement of the camera back, and a yielding operative connection between said second part and said first part so that upon closing movement of said camera back, said second part may be moved through a greater distance than the movement required for said first part.

8. A structure as defined in claim 7, further including an adjustable stop for determining the extent of travel of said first part in a direction for rendering said film driven means effective.

9. A structure as defined in claim 8, further including means controlled by said rotary member for locking said film winding means against operation, and means operated by said first part for unlocking said film winding locking means when said first part moves to its position for rendering said film driven means ineffective.

10. A structure as defined in claim 6, in which said means operated by said camera back includes a first part movable between two positions respectively rendering said film driven means effective and ineffective, a second part cooperating with said camera back in position to be moved in one direction by closing movement of the camera back, and an operative connection between said first part and said second part, and in which one of said two parts is located in the vicinity of a film held by said camera and serves as an index for determining an initial setting position for the film when said camera back is open.

11. A structure as defined in claim 1, further including a film position observation window, a series of film position indicating numerals associated with and movable with said rotary film position indicator to bring successive numerals to said observation window as successive exposure areas of the film are advanced to exposure position within the camera, and an additional indicating mark following said series of numerals at the window, geared to indicate an area next beyond the last film exposure area.

12. A structure as defined in claim 11, further including means for locking said camera back against opening movement from the time that said film position indicator moves away from its initial starting position until it reaches the position wherein said additional indicating mark reaches said observation window.

13. A structure as defined in claim 1, in which said operative connection between said driving member and said position indicator includes a first gear driven by said driving member through a constant driving connection and a second gear meshing with said first gear, said second gear having teeth omitted from a portion of its periphery which comes into contact with the first gear when said second gear has been turned to a position beyond the position corresponding to the last exposure area of the film being located in exposure position within the camera, so that said first gear may continue to be driven while winding up a paper trailing strip at the end of the film, without causing further driving of said second gear or of said film position indicator.

WILHELM KNAUF.

References Cited in the file of this patent

UNITED STATES PATENTS

| Number | Name | Date |
|---|---|---|
| 1,232,254 | Ervin et al. | July 3, 1917 |
| 2,148,636 | Muller et al. | Feb. 28, 1939 |
| 2,548,530 | Harvey | Apr. 10, 1951 |